(12) United States Patent
Aleksiev et al.

(10) Patent No.: US 9,696,796 B2
(45) Date of Patent: Jul. 4, 2017

(54) AUGMENTED REALITY SYSTEM INCORPORATING TRANSFORMING AVATARS

(71) Applicant: PLAYGROUND ENERGY LTD, Sofia (BG)

(72) Inventors: Hristo Aleksiev, Sofia (BG); Illian Milinov, Sofia (BG)

(73) Assignee: PLAYGROUND ENERGY LTD, Sofia (BG)

( * ) Notice: Subject to any disclaimer, the term of this patent is extended or adjusted under 35 U.S.C. 154(b) by 0 days.

(21) Appl. No.: 15/074,616

(22) Filed: Mar. 18, 2016

(65) Prior Publication Data

US 2016/0202754 A1    Jul. 14, 2016

Related U.S. Application Data

(62) Division of application No. 14/148,093, filed on Jan. 6, 2014, now Pat. No. 9,323,323.

(51) Int. Cl.
| A63F 9/24 | (2006.01) |
|---|---|
| G06F 3/01 | (2006.01) |
| A63F 13/31 | (2014.01) |
| A63F 13/50 | (2014.01) |
| A63F 13/40 | (2014.01) |
| A63F 13/30 | (2014.01) |

(Continued)

(52) U.S. Cl.
CPC .............. *G06F 3/011* (2013.01); *A63F 13/10* (2013.01); *A63F 13/12* (2013.01); *A63F 13/211* (2014.09); *A63F 13/25* (2014.09); *A63F 13/31* (2014.09); *A63F 13/50* (2014.09); *A63G 31/00* (2013.01); *G06T 7/194* (2017.01); *G06T 13/40* (2013.01); *G06T 19/006* (2013.01); *A63B 2024/0096* (2013.01); *A63B 2071/0638* (2013.01); *A63B 2225/20* (2013.01); *A63B 2225/50* (2013.01); *A63F 2300/105* (2013.01); *A63F 2300/1012* (2013.01); *A63F 2300/403* (2013.01); *A63F 2300/407* (2013.01); *A63F 2300/69* (2013.01); *A63F 2300/8082* (2013.01); *G06T 2200/04* (2013.01); *G06T 2207/10004* (2013.01); *G06T 2210/61* (2013.01)

(58) Field of Classification Search
CPC .. A63B 24/0062; A63B 2225/50; G06F 3/011
See application file for complete search history.

(56) References Cited

U.S. PATENT DOCUMENTS

| 5,347,186 A | 9/1994 | Konotchlck |
|---|---|---|
| 8,519,844 B2 | 8/2013 | Richey |

(Continued)

FOREIGN PATENT DOCUMENTS

WO    2009125328    10/2009

*Primary Examiner* — Steve Rowland
(74) *Attorney, Agent, or Firm* — Depeng Bi; Law Offices of Konrad Sherinian

(57) ABSTRACT

An improved playground system is disclosed. A playground toy incorporates a wireless transceiver and a motion sensor. Based on the level of activity monitored by the motion sensor, the wireless transceiver transmits a message to smart devices, such as smart phones or wearable computers that causes an augmented reality avatar for the playground toy to transform. When additional activity is noted, additional messages causing additional avatar transformations can be sent.

2 Claims, 8 Drawing Sheets

(51) Int. Cl.
*G06T 13/40* (2011.01)
*G06T 19/00* (2011.01)
*A63F 13/211* (2014.01)
*A63F 13/25* (2014.01)
*A63G 31/00* (2006.01)
*G06T 7/194* (2017.01)
*A63B 24/00* (2006.01)
*A63B 71/06* (2006.01)

(56) References Cited

U.S. PATENT DOCUMENTS

| | | | |
|---|---|---|---|
| 2009/0287103 A1* | 11/2009 | Pillai | A61B 5/0245 600/509 |
| 2010/0033030 A1 | 2/2010 | Amemiya | |
| 2010/0164990 A1 | 7/2010 | Van Doorn | |
| 2012/0083348 A1* | 4/2012 | Burgaard | A63G 9/00 472/118 |
| 2012/0130886 A1* | 5/2012 | Shergill | G06Q 30/0217 705/39 |
| 2012/0290109 A1* | 11/2012 | Engelberg | G06F 19/3481 700/91 |
| 2013/0124326 A1 | 5/2013 | Huang | |
| 2014/0287779 A1* | 9/2014 | O'Keefe | H04W 4/02 455/456.3 |
| 2014/0349752 A1* | 11/2014 | Nadel | A63F 13/06 463/31 |
| 2015/0050972 A1* | 2/2015 | Sarrafzadeh | G06Q 50/10 463/7 |

* cited by examiner

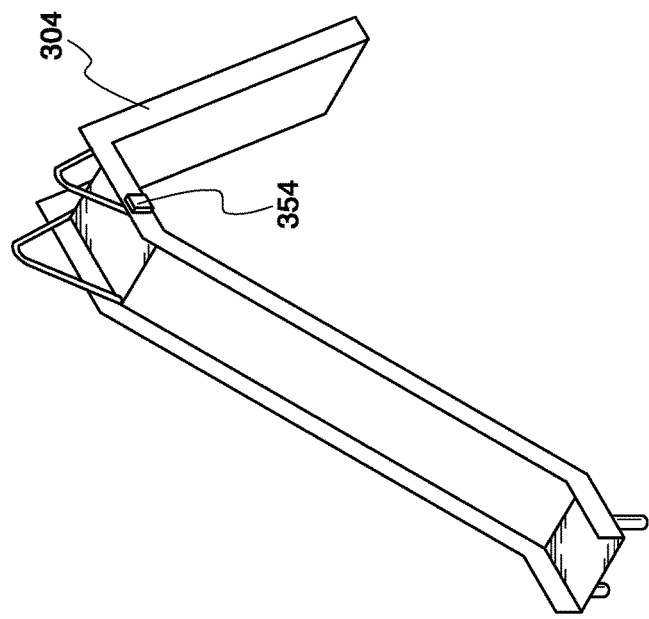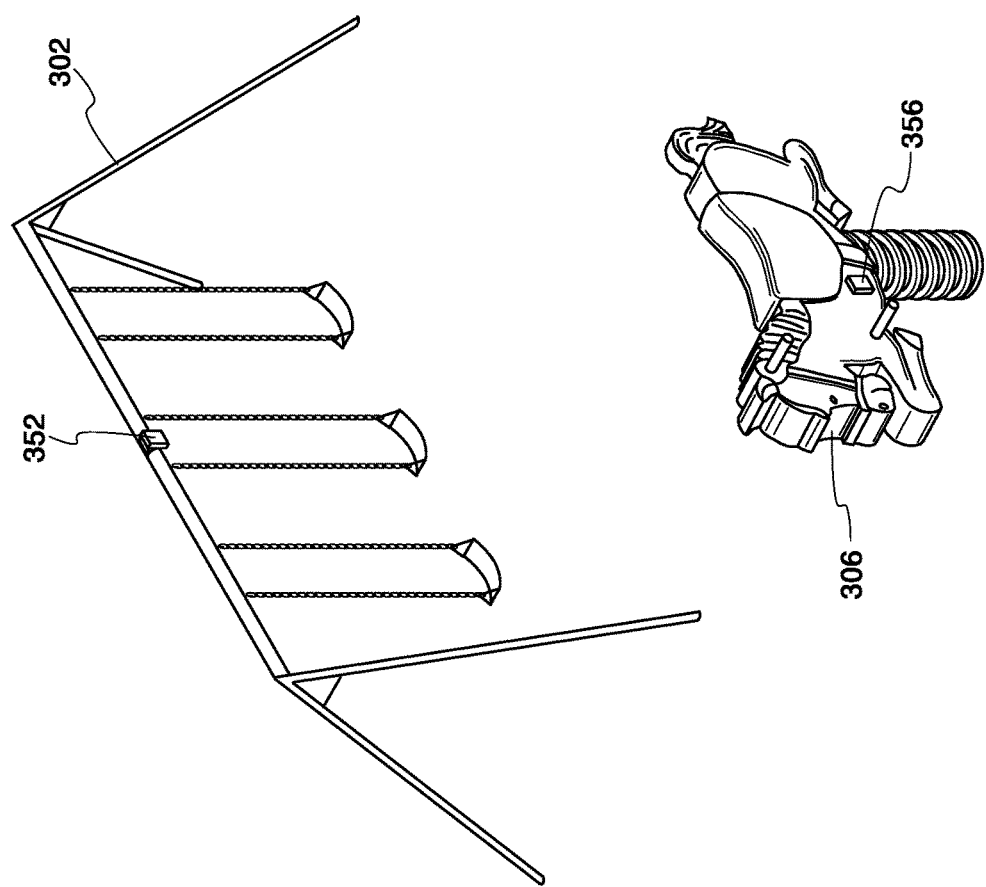
Fig. 3

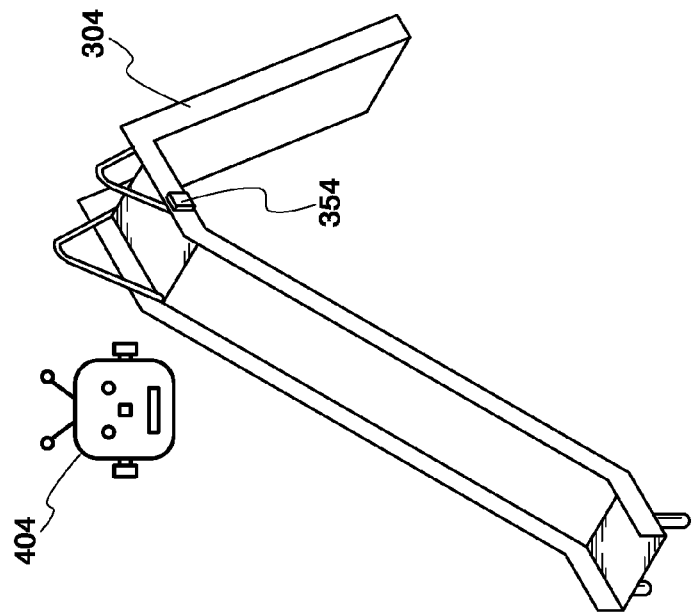
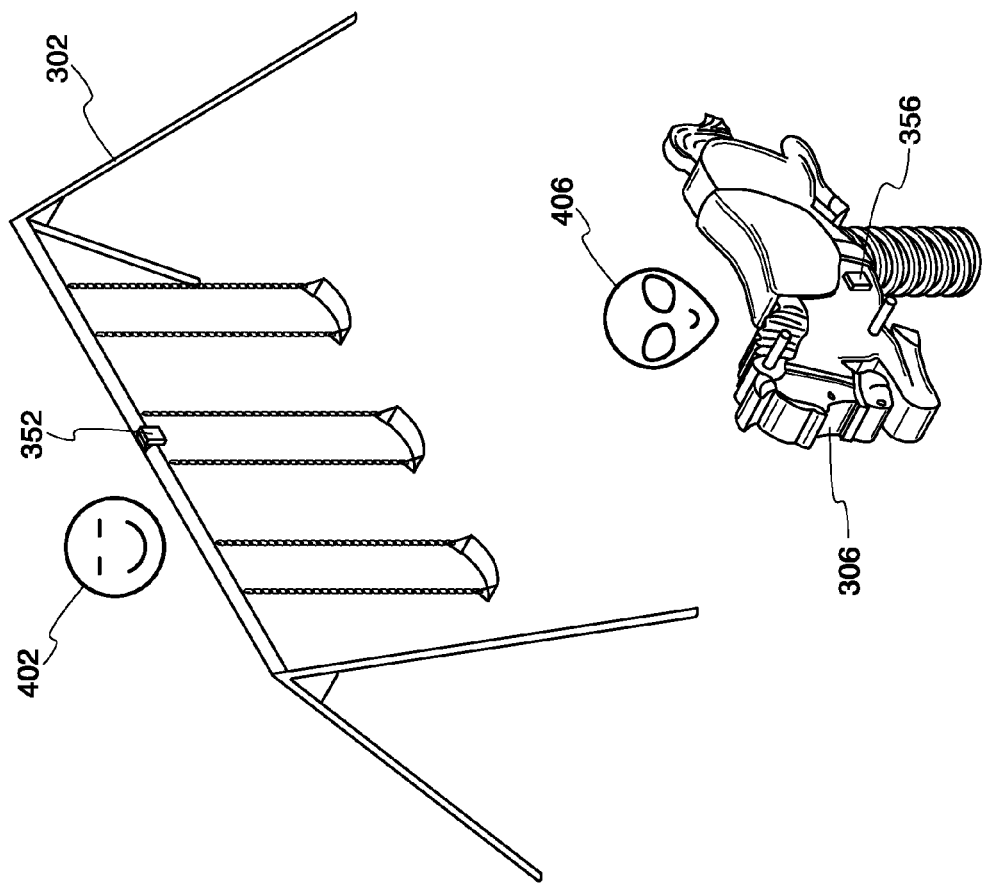
Fig. 4

AUGMENTED REALITY SYSTEM INCORPORATING TRANSFORMING AVATARS

CROSS REFERENCE TO RELATED APPLICATIONS

This application is a divisional of co-pending U.S. patent application Ser. No. 14/148,093, entitled "AUGMENTED REALITY SYSTEM INCORPORATING TRANSFORMING AVATARS," filed Jan. 6, 2014, assigned to PLAYGROUND ENERGY LTD, HRISTO CHERNOPEEV STR. NO. 5, ENTRANCE A APARTMENT 12, SOFIA, BULGARIA, and which is hereby incorporated by reference in its entirety to provide continuity of disclosure.

COPYRIGHT NOTICE

A portion of the disclosure of this patent document contains material that is subject to copyright protection. The copyright owner has no objection to the reproduction of the patent document or the patent disclosure as it appears in the files or records of the Patent and Trademark Office, but otherwise reserves all copyright rights whatsoever. The following notice applies to the software and data as described below and in the drawings that form a part of this document: Copyright Playground Energy Ltd. All Rights Reserved.

FIELD OF THE DISCLOSURE

The present disclosure generally relates to augmented reality systems. More particularly, the present disclosure relates to the use of avatars corresponding to various objects within an augmented reality system, including non-living objects, and more particularly still, relates to the transformation of avatars assigned to objects, including non-living objects, within an augmented reality system based on certain criteria. Most particularly, the present disclosure relates to the transformation of avatars assigned to various pieces of playground equipment based on children's interaction with the playground equipment.

BACKGROUND

Playgrounds are well known in the art. Generally, playgrounds are recognized as areas where children, and sometimes adults, can gather to meet others and play various games. Most playgrounds include a playset with a number of pieces of playground equipment.

Some common types of playground equipment include:
1) Swings;
2) Slides;
3) Rotating Carousels;
4) See Saws;
5) Rockers;
6) Climbing Walls;
7) Climbing Nets;
8) Climbing Platforms;
9) Poles;
10) Sand boxes.

While minor changes have been made to the design and implementation of the major types of playground equipment, there has been little change in the operation of playground equipment in many years. In particular, there has been little effort to combine classic playground equipment with modern technology, such as the Internet. Accordingly, a need exists for more technologically advanced playground equipment that incorporates modern technology.

Augmented reality technology has existed since the 1990s. Generally, an augmented reality system comprises a smart device, such as a smartphone or tablet computer, which incorporates a camera, display, GPS receiver, and Internet connection. An application running on the smart device operates the device's camera to capture an image in real time, which is displayed on the display. The application also operates the GPS receiver to determine the device's location, and in some implementations, also determines the facing of the device, which may require using a gyroscope in the device. The application uses this information to access augmented reality information through the Internet connection, which is displayed over the camera image on the display.

Typical uses of augmented reality include the display of advertisements on the display, such as special deals that augmented reality users can see while shopping, as well as other types of information, such as the history of a statue in a city. The use of avatar's in augmented reality applications to represent players of a game, for example, has been used in the prior art. However, the use of avatars in specific and augmented reality in general, has been used primarily to display static information.

Accordingly, there exists a need to utilize more dynamic augmented reality systems.

OBJECTS OF THE DISCLOSED SYSTEM, METHOD, AND APPARATUS

Accordingly, it is an object of this disclosure to provide improved playground equipment.

Another object of this disclosure is to provide improved playground equipment incorporating an augmented reality avatar;

Another object of this disclosure is to provide improved playground equipment incorporating transforming augmented reality avatars;

Another object of this disclosure is to provide an augmented reality system incorporating transforming augmented reality avatars.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

An improved playground playset is disclosed. The disclosed playset comprises one or more playground toys, each including a motion sensor, a processor, a wireless transceiver, and a power source. The processor is adapted to monitor the motion sensor and transmit a message using the wireless transceiver with the amount of detected motion to nearby smart devices. The nearby smart devices, each of which can be running an augmented reality application, receive the motion indication message, and based on this message, modify the state of an avatar that is associated with a playground toy. The state of the avatar can include a particular image or collection of images, as well as a particular sound or collection of sounds.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a perspective view of a playground playset constructed in accordance with this disclosure;

FIG. 4 is a perspective of the playground playset of FIG. 3 viewed through an augmented reality viewer constructed in accordance with this disclosure;

DETAILED DESCRIPTION

Figure 1:
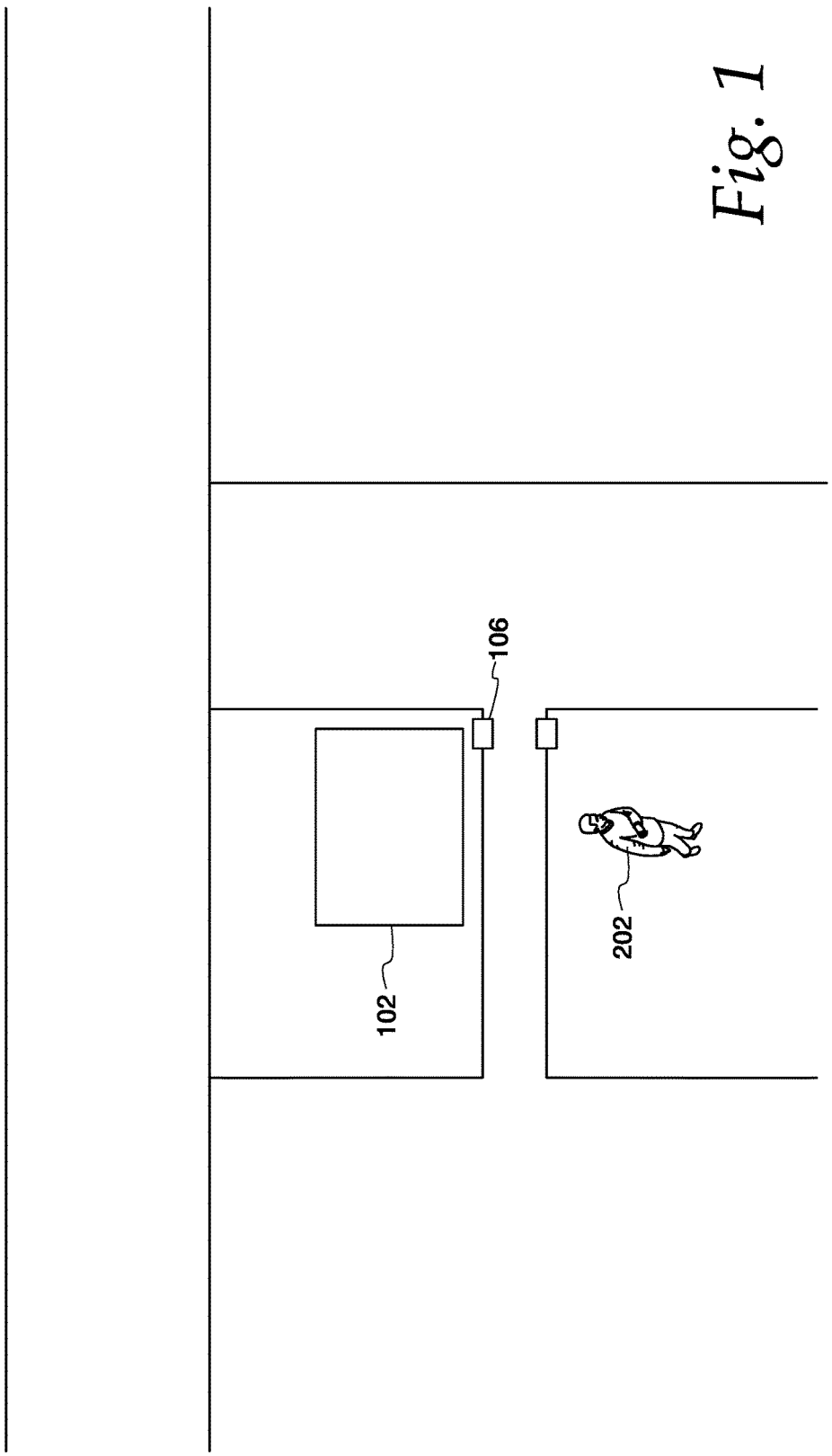
FIG. 1 is an overhead view of an augmented reality system incorporating one or more transforming augmented reality images and constructed in accordance with this disclosure.

Turning to the Figures and to FIG. 1 in particular, an overhead view of an augmented reality system constructed in accordance with the disclosed invention. In particular, the depicted system is an overhead view of an urban area incorporating an aspect of the disclosed augmented reality system. The overhead view consists of a building 102 and an interaction device 106.

Figure 2:
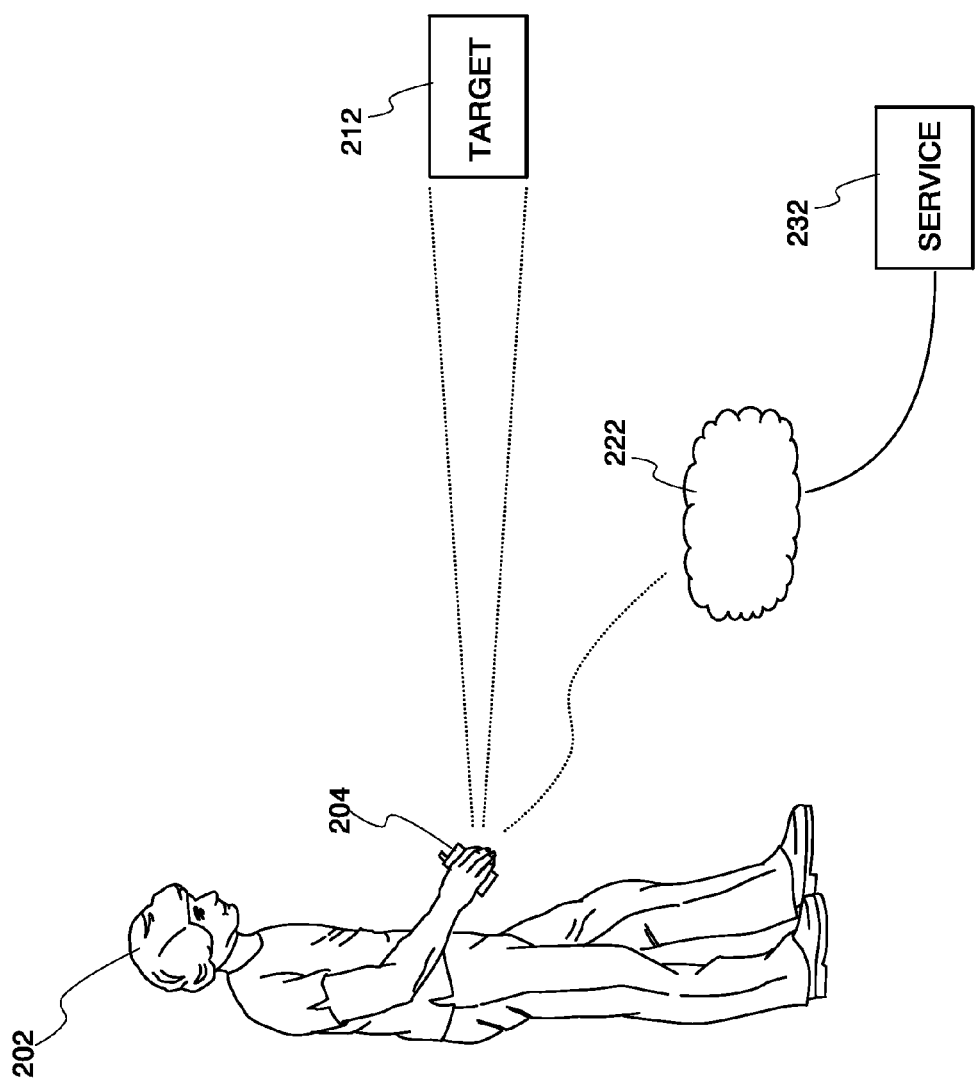
FIG. 2 is a system diagram of an interaction circuit for use with an augmented reality system constructed in accordance with this disclosure.

Turning to FIG. 2, a user 202 can view a target 212 using a viewing application (not shown) operating on the user's 202 smart device 204. As depicted, the smart device 204 is shown as a smart phone. However, other types of smart devices can be used, such as, for example, wearable technology including smart watches and smart glasses. The smart device 204 accesses augmented reality information through a network 222 such as the Internet from an augmented reality service 232. The augmented reality service 232 can be implemented as a server, or as a cloud based service.

Returning to FIG. 1, the depicted system implements an augmented reality treasure hunt. In one implementation, the user 202 would only need to approach within an activation distance of particular point, such as 106. On coming within the activation distance, an avatar, such as a character in a story can be displayed. The displayed avatar can then pose a riddle, puzzle or task for the user 202 to solve. After the user 202 completes the avatar's request, the avatar can be changed to indicate that the user has completed that part of the treasure hunt.

In a second implementation, the user 202 would need to interact with interaction device 106. The interaction may require approaching within an activation distance, such as within range of a wireless device disposed within the interaction device 106. On coming within the activation distance, an avatar, such as a character in a story can be displayed. As before, the displayed avatar can then pose a riddle, puzzle or task for the user 202 to solve. However, in this implementation, the solution to the riddle, puzzle, or task would require that the user 202 interact with the interaction device 106. For example, the user 202 may need to press a button on the interaction device 106. After the user 202 completes the avatar's request, the avatar can be changed.

Turning to FIG. 3, a perspective view of a playground playset constructed in accordance with this disclosure is depicted. The playset comprises a number of playground toys, including a swing set 302, a slide 304, and a rocker 306. Each of the playground toys also includes an interaction circuit; i.e., the swing set 302 includes interaction circuit 352; the slide 304 includes interaction circuit 354; and the rocker 306 includes interaction circuit 356. The interaction circuit resident in each operates to communicate with an application resident on a user's smart device (not shown). The interaction circuit associated with each playground toy causes the application on the user's smart device to display an avatar. For example, the avatar displayed on the user's smart device associated with the swing set 302 may be a simple line face 402, while the avatar associated with the slide may be a robot face 404, and the avatar associated with the rocker may be an alien face 406.

As further explained herein, the avatar associated with each playground toy changes based on the interaction of users with the playground toy. For example, an avatar that is not being played with may appear sad, and may generate sad noises, such as whimpering, etc. If a child begins to play with the toy, such as, for example, by swinging on the swings, the avatar changes from a sad face to a contented face, and then a happy face. Similarly, the sounds made by the avatar will also change from sad to contented to happy (e.g., laughter, etc.).

Figure 5:
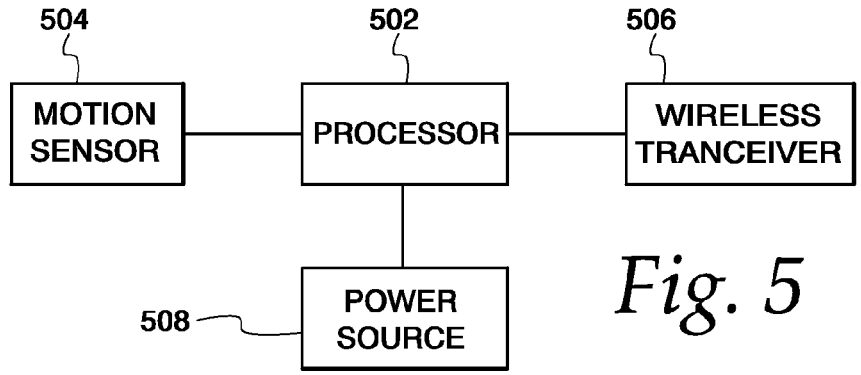
FIG. 5 is a simplified schematic diagram of an interaction circuit for use with a playground toy and constructed in accordance with this disclosure.

Turning to FIG. 5, a simple schematic diagram of an interaction circuit is set forth. Each interaction circuit comprises a processor 502, which is coupled to a motion sensor 504 and a wireless transceiver 506. A power source 508, such as a battery or generator, supplies power to all of the other components. The wireless transceiver can be of various different types, including, for example, Bluetooth and 802.11. The interaction circuit interacts with applications executing on smart devices that are within range of the wireless transceiver 506.

Figure 6:
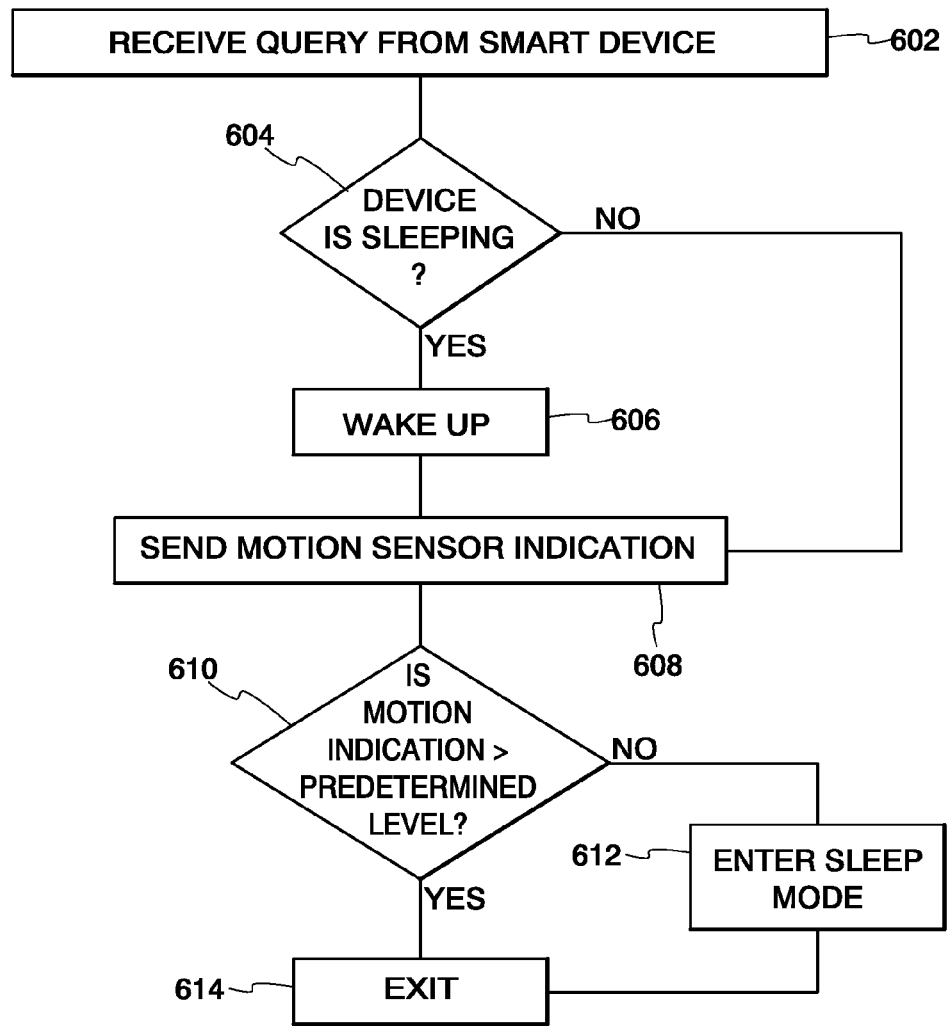
FIG. 6 is a flowchart of a process for use by an interaction circuit to communicate with nearby smart devices.

FIG. 6 illustrates a process by which an interaction circuit can interact with nearby smart devices. In step 602 the interaction circuit receives a query from a nearby smart device. In step 604, a determination is made as to whether the interaction circuit was in sleep mode. If the device was in sleep mode, it wakes up in step 606. Execution then transitions to step 608, which is where execution transitions to if the interaction circuit was not in sleep mode.

In step 608, a readout from the motion sensor is sent to the nearby smart device. Execution then transitions to step 610 where a check is made as to whether the motion indication exceeds a predetermined level. If not, execution transitions to step 612, where sleep mode is entered, and the process exits in step 614. Similarly, if the motion indication exceeds a predetermined level, the process exits in step 614.

Figure 7:
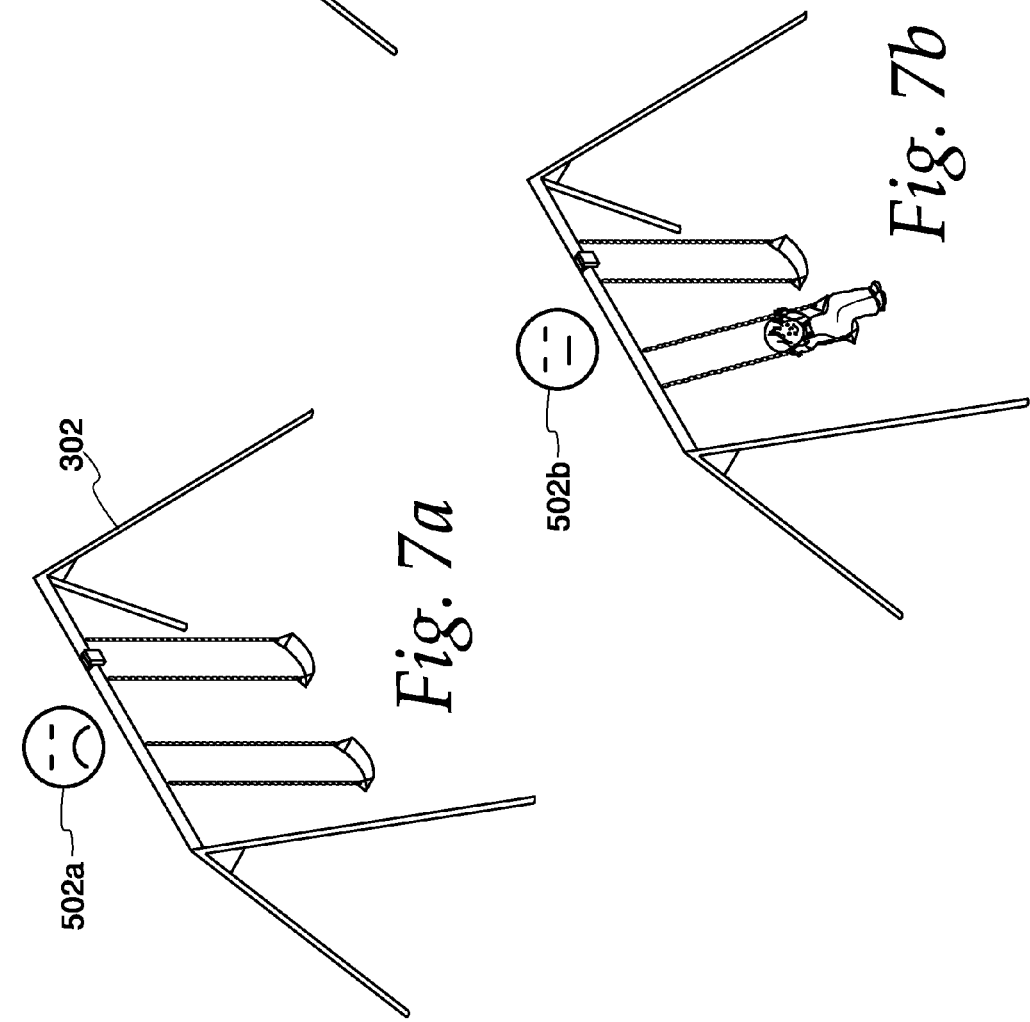
FIGS. 7*a-c* are views of a display from a viewing device for use with the improved playground system of this disclosure.

FIGS. 7*a*-7*c* are views of an augmented reality application displaying a swing set 302 and its avatar 502 in various states. In FIG. 7*a*, the avatar 502 is in a sad state 502*a* as no one is playing with the swing set 302. In FIG. 7*b*, the avatar 502 is in a contented state 502b as a child has started playing with the swing set 302 as detected by a motion detector in the interaction circuit disposed in the swing set 302. Finally, in FIG. 7c, the avatar 502 is in a happy state 502c as a pair of children are vigorously playing with the swing set 302 as detected by the motion detector disposed in the swing set 302.

The disclosed application is meant to run on a variety of smart devices, including smart phones, tablets, and wearable devices, such as smart glasses and smart watches. Certain devices, such as smart phones, are likely to have multiple embedded cameras; i.e., one on the back and one on the front. When implemented on a smart phone, a preferred embodiment of the disclosed application would utilize the front facing camera. This would allow a user, such as a mother, to show her child an image of the child playing with and interacting with the avatar assigned to each playground toy.

Figure 8:
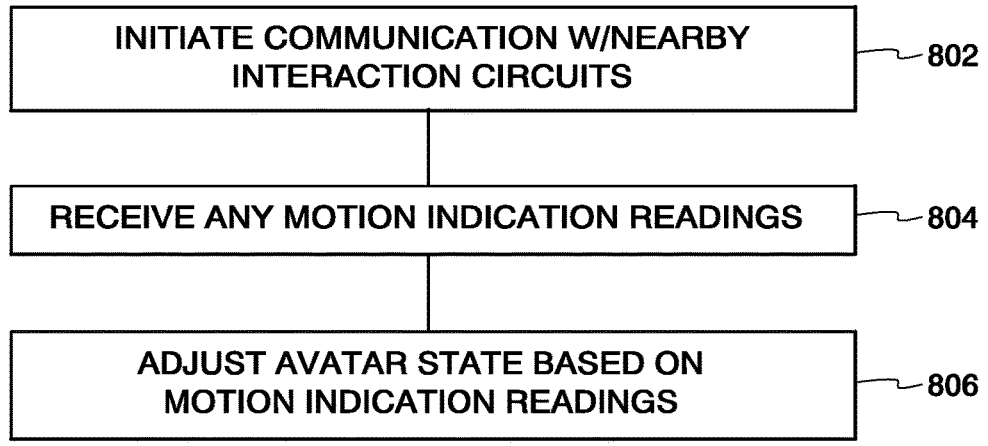
FIG. 8 is a flowchart of a process for use by a smart device to communicate with nearby interaction circuits.

FIG. 8 depicts a process by which smart devices can communicate with nearby interaction circuits. In step 802, a smart device can initiate communication with nearby interaction circuits. In step 804, the smart device receives any motion indication readings from the nearby interaction circuits, and in step 806, the smart device adjusts the state of any avatars that the device is tracking. For example, in step 806, the smart device can adjust the appearance of an avatar and the sound effects produced by an avatar.

It should be noted that there are other ways that a similar function can be accomplished other than the specific processes and methods outlined herein. In particular, the motion of a playground toy can be sensed using the facilities of the smart device; i.e.; the camera and processor. An algorithm operating on the smart device can sense the precise level of motion of the playground toy, and adjust the state of avatars associated with the playground toy.

Figure 9:
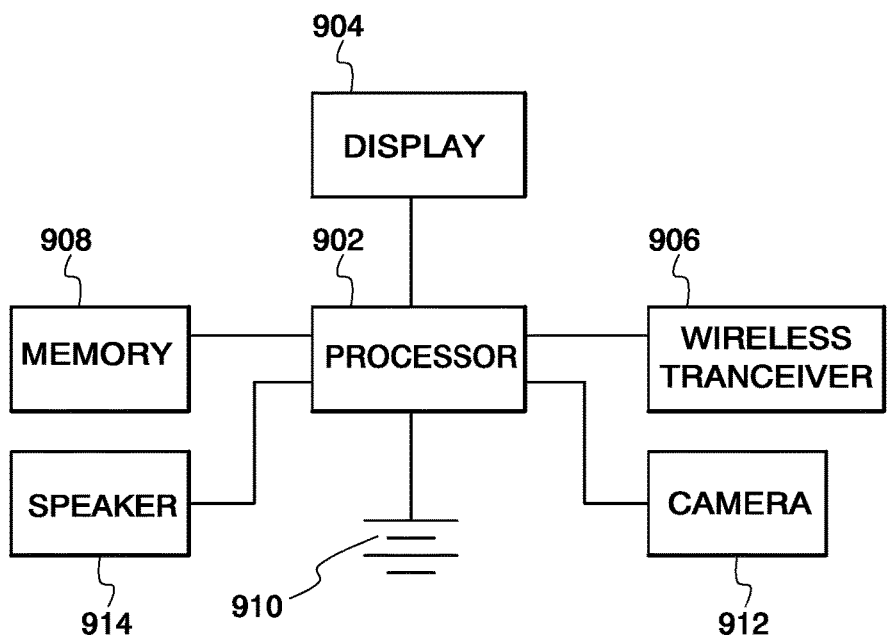
FIG. 9 is a simplified schematic diagram of a smart device for use with a system constructed in accordance with this disclosure.

FIG. 9 depicts a simplified view of the operative circuit of a smart device for use with disclosed augmented reality system. Various smart devices can be used, such as, for example, smart phones, tablets, and smart glasses. However, all will generally comprise a processor 902, a display 904, a wireless transceiver 906, a memory 908, a battery 910, and a camera 912. In certain embodiments, the smart device can also include a speaker 914. The smart device is adapted to run an augmented reality application as described herein.

Figure 10:
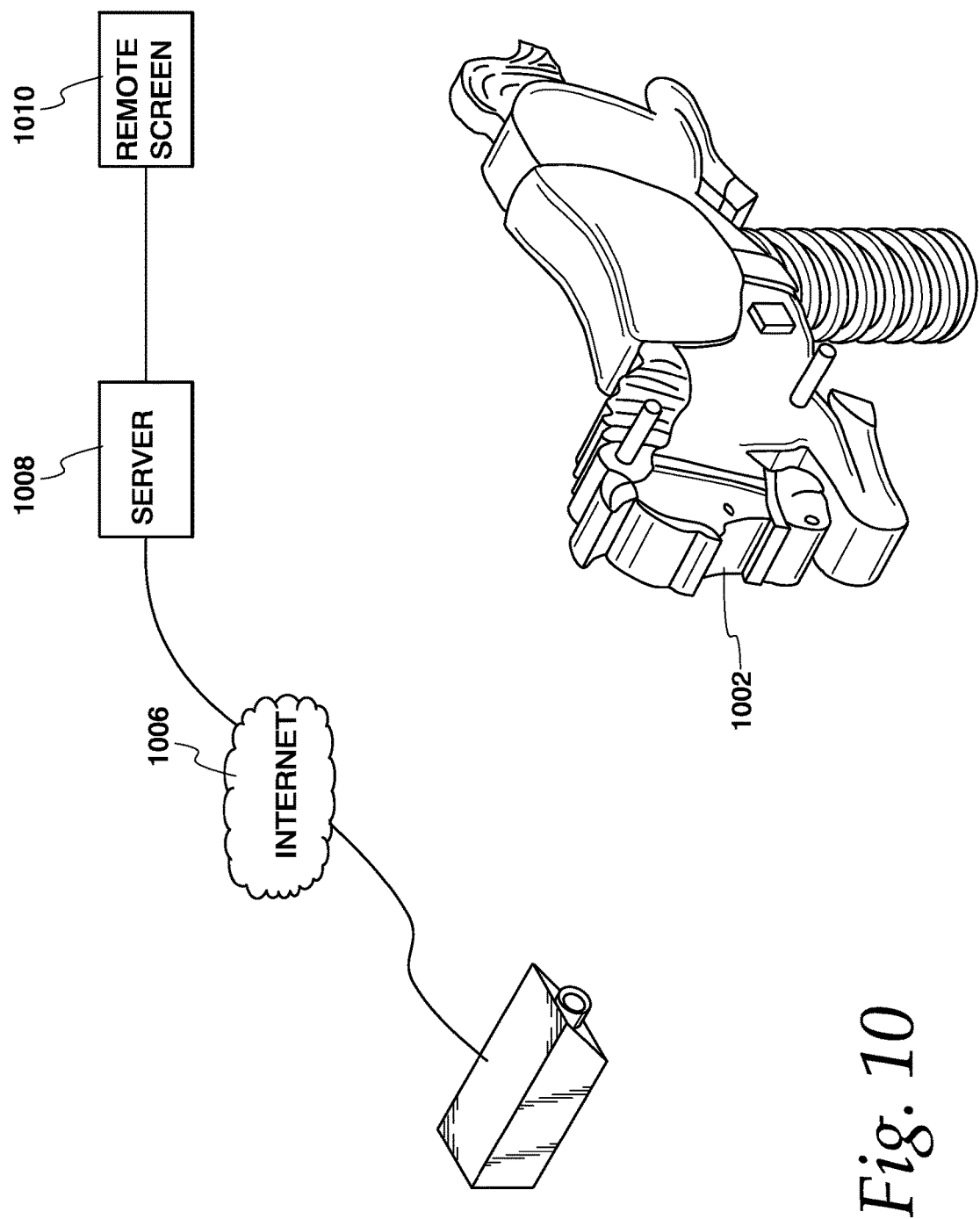
FIG. 10 is an alternative system diagram of an interaction circuit for use with an augmented reality system constructed in accordance with this disclosure.

It should be noted that an embodiment has been described that makes use of mobile devices. Other embodiments can also be made and still practice the disclosed system. For example, turning to FIG. 10, at least one fixed camera 1004 could be disposed so as to view a playground toy 1002. The fixed camera 1002 records live video of the playground toy 1002 and anyone who interacted with it. The live video is transmitted via the Internet 1006 to a remote server 1008, which applies an augmented reality algorithm as discussed herein. In particular, an avatar with varying states would be superimposed on the live video and associated with the playground toy 1002. Such a system could be used, for example, to display to lines of waiting patrons at theme parks. Similarly, the system could be used to display scenes of children playing at mall playgrounds on public screens disposed within the mall (such as at a mall food court).

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A playground toy comprising:
   i) a motion sensor;
   ii) a processor coupled to the motion sensor;
   iii) a wireless transceiver coupled to the processor;
   iv) wherein the processor is adapted to monitor the motion sensor for a predetermined level of activity;
   v) wherein the processor is adapted to receive a query from a smart device via the wireless transceiver; and
   vi) wherein, responsive to the query from the smart device, the processor is adapted to transmit a message to the smart device using the wireless transceiver when the predetermined level of activity is detected, wherein the smart device displays a first avatar corresponding to the predetermined level of activity.

2. The playground toy of claim 1 wherein the processor is further adapted to transmit a second message to the smart device using the wireless transceiver when a second predetermined level of activity is detected, wherein the smart device displays a second avatar corresponding to the predetermined level of activity and wherein the second avatar is different from the first avatar.

* * * * *